(12) United States Patent
Wagner et al.

(10) Patent No.: US 10,007,827 B2
(45) Date of Patent: Jun. 26, 2018

(54) SYSTEMS AND METHODS FOR IDENTIFYING AND PROCESSING A VARIETY OF OBJECTS

(71) Applicant: Berkshire Grey Inc., Waltham, MA (US)

(72) Inventors: Thomas Wagner, Concord, MA (US); Kevin Ahearn, Camden, SC (US); Benjamin Cohen, Somerville, MA (US); Michael Dawson-Haggerty, Pittsburgh, PA (US); Christopher Geyer, Arlington, MA (US); Thomas Koletschka, Cambridge, MA (US); Kyle Maroney, North Attleboro, MA (US); Matthew T. Mason, Pittsburgh, PA (US); Gene Temple Price, Somerville, MA (US); Joseph Romano, Somerville, MA (US); Daniel Smith, Pittsburgh, PA (US); Siddhartha Srinivasa, Pittsburgh, PA (US); Prasanna Velagapudi, Pittsburgh, PA (US); Thomas Allen, Reading, MA (US)

(73) Assignee: Berkshire Grey, Inc., Waltham, MA (US)

( * ) Notice: Subject to any disclaimer, the term of this patent is extended or adjusted under 35 U.S.C. 154(b) by 0 days. days.

(21) Appl. No.: 15/260,837

(22) Filed: Sep. 9, 2016

(65) Prior Publication Data

US 2017/0121113 A1 May 4, 2017

Related U.S. Application Data

(60) Provisional application No. 62/217,200, filed on Sep. 11, 2015, provisional application No. 62/269,640, filed on Dec. 18, 2015.

(51) Int. Cl.
*G06K 7/14* (2006.01)
*G06K 19/06* (2006.01)
(Continued)

(52) U.S. Cl.
CPC .......... *G06K 7/1443* (2013.01); *B25J 9/1694* (2013.01); *B25J 9/1697* (2013.01); *B25J 19/022* (2013.01);
(Continued)

(58) Field of Classification Search
CPC ............ B65G 1/1373; G06K 2209/19; G06K 7/1443; G06K 7/1447; B25J 9/1694
See application file for complete search history.

(56) References Cited

U.S. PATENT DOCUMENTS

| 3,734,286 A | 5/1973 | Simjian |
| 4,186,836 A | 2/1980 | Wassmer et al. |

(Continued)

FOREIGN PATENT DOCUMENTS

| DE | 3919865 A1 | 12/1990 |
| EP | 2053350 A1 | 4/2009 |

(Continued)

OTHER PUBLICATIONS

International Search Report & Written Opinion issued by International Searching Authority in related International Patent Application No. PCT/US2016/066786 dated Mar. 20, 2017.
(Continued)

*Primary Examiner* — Thomas Randazzo
(74) *Attorney, Agent, or Firm* — Gesmer Updegrove LLP (57) ABSTRACT

A robotic system is disclosed that include an articulated arm and a first perception system for inspecting an object, as well as a plurality of additional perception systems, each of which is arranged to be directed toward a common area in which an object may be positioned by the robotic arm such
(Continued)

that a plurality of views within the common area may be obtained by the plurality of additional perception systems.

70 Claims, 8 Drawing Sheets (51) Int. Cl.
| | |
|---|---|
| *B65G 1/137* | (2006.01) |
| *B25J 19/02* | (2006.01) |
| *G05B 19/12* | (2006.01) |
| *G06Q 10/08* | (2012.01) |
| *B25J 9/16* | (2006.01) |
| *G06K 9/00* | (2006.01) |

(52) U.S. Cl.
CPC .......... *B25J 19/023* (2013.01); *B65G 1/1373* (2013.01); *G05B 19/124* (2013.01); *G06K 7/1447* (2013.01); *G06K 9/00033* (2013.01); *G06K 9/00201* (2013.01); *G06K 19/06028* (2013.01); *G06Q 10/087* (2013.01); *G05B 2219/14005* (2013.01); *G06K 2209/19* (2013.01)

(56) References Cited

U.S. PATENT DOCUMENTS

| | | | |
|---|---|---|---|
| 5,495,097 A | 2/1996 | Katz et al. | |
| 5,713,473 A | 2/1998 | Satake et al. | |
| 6,060,677 A | 5/2000 | Ulrichsen et al. | |
| 6,076,023 A * | 6/2000 | Sato ................... | G06K 17/00 414/273 |
| 6,087,608 A | 7/2000 | Schlichter et al. | |
| 6,705,528 B2 | 3/2004 | Good et al. | |
| 6,721,444 B1 | 4/2004 | Gu et al. | |
| 7,313,464 B1 | 12/2007 | Perreault et al. | |
| 7,347,376 B1 | 3/2008 | Biss et al. | |
| 7,474,939 B2 | 1/2009 | Oda et al. | |
| 8,662,314 B2 | 3/2014 | Jones et al. | |
| 8,811,722 B2 | 8/2014 | Perez Cortes et al. | |
| 8,823,801 B2 | 9/2014 | Jacobson | |
| 8,874,270 B2 * | 10/2014 | Ando ................... | B25J 9/1697 700/250 |
| 8,972,049 B2 * | 3/2015 | Tidhar ................... | B65B 5/103 700/236 |
| 9,102,053 B2 * | 8/2015 | Suzuki ................ | B25J 9/1612 |
| 9,120,622 B1 * | 9/2015 | Elazary ............... | B65G 1/1373 |
| 9,227,323 B1 * | 1/2016 | Konolige ............. | B25J 9/163 |
| 9,259,844 B2 | 2/2016 | Xu et al. | |
| 9,266,237 B2 * | 2/2016 | Nomura ............... | B25J 9/1612 |
| 9,283,680 B2 * | 3/2016 | Yasuda ............. | G06K 9/00201 |
| 9,486,926 B2 * | 11/2016 | Kawano .............. | G06Q 10/087 |
| 9,492,923 B2 * | 11/2016 | Wellman .............. | B25J 9/1612 |
| 9,604,363 B2 | 3/2017 | Ban | |
| 2001/0056313 A1 | 12/2001 | Osborne, Jr. | |
| 2002/0147568 A1 | 10/2002 | Wenzel et al. | |
| 2002/0169698 A1 * | 11/2002 | Chien ................ | G06Q 10/087 705/28 |
| 2006/0190356 A1 | 8/2006 | Nemet | |
| 2008/0181485 A1 | 7/2008 | Beis et al. | |
| 2010/0260380 A1 | 10/2010 | Kaeser et al. | |
| 2011/0320036 A1 | 12/2011 | Freudelsperger | |
| 2013/0051696 A1 * | 2/2013 | Garrett ................ | G01B 11/245 382/254 |
| 2013/0051969 A1 | 2/2013 | Garrett et al. | |
| 2013/0202195 A1 | 8/2013 | Perez Cortes et al. | |
| 2013/0245824 A1 | 9/2013 | Barajas et al. | |
| 2014/0067127 A1 | 3/2014 | Gotou | |
| 2014/0166549 A1 | 6/2014 | Ito et al. | |
| 2014/0305847 A1 | 10/2014 | Kudrus | |
| 2014/0360924 A1 | 12/2014 | Smith et al. | |
| 2015/0081090 A1 * | 3/2015 | Dong ................... | B07C 5/3422 700/230 |
| 2015/0217937 A1 * | 8/2015 | Marquez .............. | B65G 1/1373 700/216 |
| 2015/0224650 A1 | 8/2015 | Xu et al. | |
| 2015/0306634 A1 * | 10/2015 | Maeda ..................... | B07C 3/14 382/101 |
| 2015/0352721 A1 | 12/2015 | Wicks et al. | |
| 2015/0375398 A1 * | 12/2015 | Penn ................... | G06Q 10/083 700/218 |
| 2016/0243704 A1 | 8/2016 | Vakanski et al. | |
| 2016/0244262 A1 * | 8/2016 | O'Brien .............. | B65G 1/1373 |
| 2016/0379076 A1 * | 12/2016 | Nobuoka ................. | G06K 9/46 382/103 |
| 2017/0024896 A1 * | 1/2017 | Houghton ............ | G06Q 10/087 |
| 2017/0050315 A1 | 2/2017 | Henry et al. | |

FOREIGN PATENT DOCUMENTS

| | | |
|---|---|---|
| JP | 05324662 | 12/1993 |
| JP | H05324662 A | 12/1993 |
| JP | 2003150230 A | 5/2003 |
| WO | 2005022076 A2 | 3/2005 |
| WO | 2010034044 A2 | 4/2010 |
| WO | 2010099873 A1 | 9/2010 |
| WO | 2015162390 A1 | 10/2015 |

OTHER PUBLICATIONS

Office Action issued by U.S. Appl. No. 15/228,692 dated May 22, 2017.
International Search Report and the Written Opinion issued by the International Searching Authority dated Dec. 8, 2016 in related International Application No. PCT/US2016/050949.
Bohg, Jeannette, et al., "Data-Driven Grasp Synthesis—A Survey", Transactions on Robotics, pp. 289-309 (Apr. 14, 2016).
Rembold, Derk, et al., "Object Turning for Barcode Search", Proceedings of the 2000 IEEE/RSK—Intl Conf. on Intelligent Robots and Systems, pp. 1267 (Oct. 31, 2000).
Cipolla, Roberto, et al., "Vissually Guided Grasping in Unstructured Environments", Journal of Robotics and Autonomous Systems, pp. 337-346 (Mar. 3, 2001).
Klingbeil, Ellen, et al., "Grasping with Application to an Autonomous Checkout Robot", Procedings—IEEE Int'l Conf. on Robotics and Automation, pp. 2837-2844 (May 9, 2011).

* cited by examiner

SYSTEMS AND METHODS FOR IDENTIFYING AND PROCESSING A VARIETY OF OBJECTS

PRIORITY

The present application claims priority to U.S. Provisional Patent Application Ser. No. 62/217,200 filed Sep. 11, 2015 as well as U.S. Provisional Patent Application Ser. No. 62/269,640 filed Dec. 18, 2015, the disclosures of which are hereby incorporated by reference in their entireties.

BACKGROUND

The invention generally relates to robotic and other sortation systems, and relates in particular to robotic and other sortation systems that are intended to be used in dynamic environments requiring the system to accommodate processing a variety of objects.

Many order fulfillment operations achieve high efficiency by employing a process called wave picking. In wave picking, orders are picked from warehouse shelves and placed into bins containing multiple orders that are sorted downstream. At the sorting stage individual articles are identified, and multi-article orders are consolidated into a single bin or shelf location so that they may be packed and then shipped to customers. The process of sorting these articles has been done by hand. A human sorter picks an article from an incoming bin, finds the barcode on the object, scans the barcode with a handheld barcode scanner, determines from the scanned barcode the appropriate bin or shelf location for the article, and then places the article in the so-determined bin or shelf location where all articles for that order are placed.

Manually operated barcode scanners are generally either fixed or handheld systems. With fixed systems, such as those used at point-of-sale systems, the operator holds the article and places it in front of the scanner so that the barcode faces the scanning device's sensors, and the scanner, which scans continuously, decodes any barcodes that it can detect. If the article is not immediately detected, the person holding the article typically needs to vary the position or rotation of the article in front of the fixed scanner, so as to make the barcode more visible to the scanner. For handheld systems, the person operating the scanner looks for the barcode on the article, and then holds the scanner so that the article's barcode is visible to the scanner, and then presses a button on the handheld scanner to initiate a scan of the barcode.

Other ways of identifying items by barcode scanning require that the barcode location be controlled or constrained so that a fixed or robot-held barcode scanner can reliably see the barcode. Automatic barcode scanners also involve either fixed or hand-held systems, and the same principles apply. In the case of barcode scanners typically used in industrial applications, the possible positions of barcodes must be tightly controlled so that the barcodes are visible to the one or more scanners. For example, one or more barcode scanners may be placed in fixed locations relative to a conveyor or series of moving trays so that the scanners may scan objects, typically boxes, as they pass by the scanners. In these installations the range of placement of the barcodes is comparatively limited as they must be on labels affixed to one of four sides or top of a box, which also needs to be presented at orientations suitable for scanning. The detected barcode is then associated with the immediate section of the conveyor or is associated with the particular moving tray in which the object had been placed prior to scanning.

In all of these cases, the systems employ sensors, cameras or laser reflectivity sensors, as well as software to detect barcodes and decode them. These methods have inherent limitations that include the range of distances of orientations relative to the detection system, over which they are able to reliably scan barcodes. Firstly, the barcode must be facing the scanner; secondly the range to the barcode must be such that individual elements can be reliably distinguished; and, thirdly, the tilt and skew of the barcode must be such that individual elements can be reliably distinguished. The types of sensors employed, and the robustness of the software detection and decoding schemes determine these performance parameters. There remains a need, therefore, for an object identification system for a robotic system that is able to accommodate the automated identification and processing of a variety of objects in a variety of orientations.

SUMMARY

In accordance with an embodiment, the invention provides a robotic system that include an articulated arm and a first perception system for inspecting an object, as well as a plurality of additional perception systems, each of which is arranged to be directed toward a common area in which an object may be positioned by the robotic arm such that a plurality of views within the common area may be obtained by the plurality of additional perception systems.

In accordance with another embodiment, the invention provides a method of identifying an object in a robotic system including an articulated arm. The method includes the steps of inspecting the object using a first perception system and providing an inspection response signal representative of whether the item has been identified, moving the object to a plurality of additional perception systems responsive to the inspection response signal, and inspecting the object using the plurality of additional perception systems, each of which is arranged to be directed toward the object in a common area from a different view of a plurality of views of the object within the common area that may be obtained by the plurality of additional perception systems.

In accordance with a further embodiment, the invention provides a perception system for assisting in identifying an object. The perception system includes a plurality of perception units that are each positioned to be directed toward a plurality of locations along an object path that an object may take as it object travels through the perception system.

BRIEF DESCRIPTION OF THE DRAWINGS

The following description may be further understood with reference to the accompanying drawings in which.

The drawings are shown for illustrative purposes only.

DETAILED DESCRIPTION

In accordance with an embodiment, the invention provides an object perception system for the purposes of automatically sorting individual objects in a set. In applications such as order fulfillment, objects are collected into heterogeneous sets and need to be sorted. Individual objects need to be identified and then routed to object-specific locations. The described system reliably automates the identification of such objects by employing both automated barcode scanners and a robotic arm. In accordance with certain embodiments, for example, the system uses the robotic arm to hold the item in front of one or more barcode scanners so that the object may be scanned. In accordance with various embodiments, the perception units (e.g., cameras or scanners) may look for a variety of codes such as indicia (e.g., barcodes, radio frequency tags, Stock Keeping Unit (SKU), Universal Product Code (UPC), low wavelength IR (LWIR), as well as invisible barcodes and digital watermarks such as Digimarc DWCode, etc.)

Whereas fixed industrial scanners require that the object's barcode be situated so that its barcode is visible to a scanner, the robotic arm of the present invention may pick an object out of a heterogeneous collection of objects where the barcode is not visible and scan the item. The result is an automated barcode scanning system for arbitrary items in a heterogeneous stream of objects that may be used to accurately and reliably identify items.

Sorting for order fulfillment is one application for automatically identifying objects from a heterogeneous object stream. Barcode scanners have a wide variety of uses including identifying the stock keeping unit of an article, or tracking parcels. The described system may have many uses in the automatic identification and sortation of objects.

Operating in conjunction with a robotic pick and place system, such a system of an embodiment of the present invention automates part of the sorting process, in particular the step of identifying picked objects. Instead of a person picking the object from a bin, a robotic arm may pick an object from a bin, places the object in front of a barcode scanner, and then, having obtained identification codes for the object, places the object in the appropriate bin or shelf location. Since barcode scanners employ cameras or lasers to scan 1D or 2D symbologies printed on labels affixed to articles, the barcodes must be visible to the scanner's sensors for successful scanning in order to automatically identifying items in a heterogeneous stream of arbitrary articles, as in a jumbled set of articles found in a bin.

In accordance with various embodiments, therefore, the invention provides a method for determining the identity of an object from a collection of objects, as well as a method for scanning the barcode of an object employing one or more barcode scanners and a robotic arm with end-effector holding the object. The invention further provides a method for determining the placement of fixed barcode scanners so as to maximize the probability of successfully scanning an object held by a robot end-effector in accordance with certain embodiments, as well as a method for determining a sequence of placements of a robot end-effector so as to minimize the time it takes a configuration of one or more barcode scanners to successfully scan an object, and a method for scanning the barcode of an object by employing a barcode scanner as an end-effector on a robotic arm.

An important aspect is the ability to identify objects via barcode or other visual markings of objects by employing a robot arm to pick up individual objects and place or drop them in front of one or more scanners. Automated scanning systems would be unable to see barcodes on objects that are presented in a way that their barcodes are not exposed or visible. Since the system uses a robot to hold the object, it can either maneuver the object so as to make the barcode visible, or employ multiple scanners that view the article from multiple viewpoints to acquire the barcode, irrespective of how the object is held.

Figure 1:
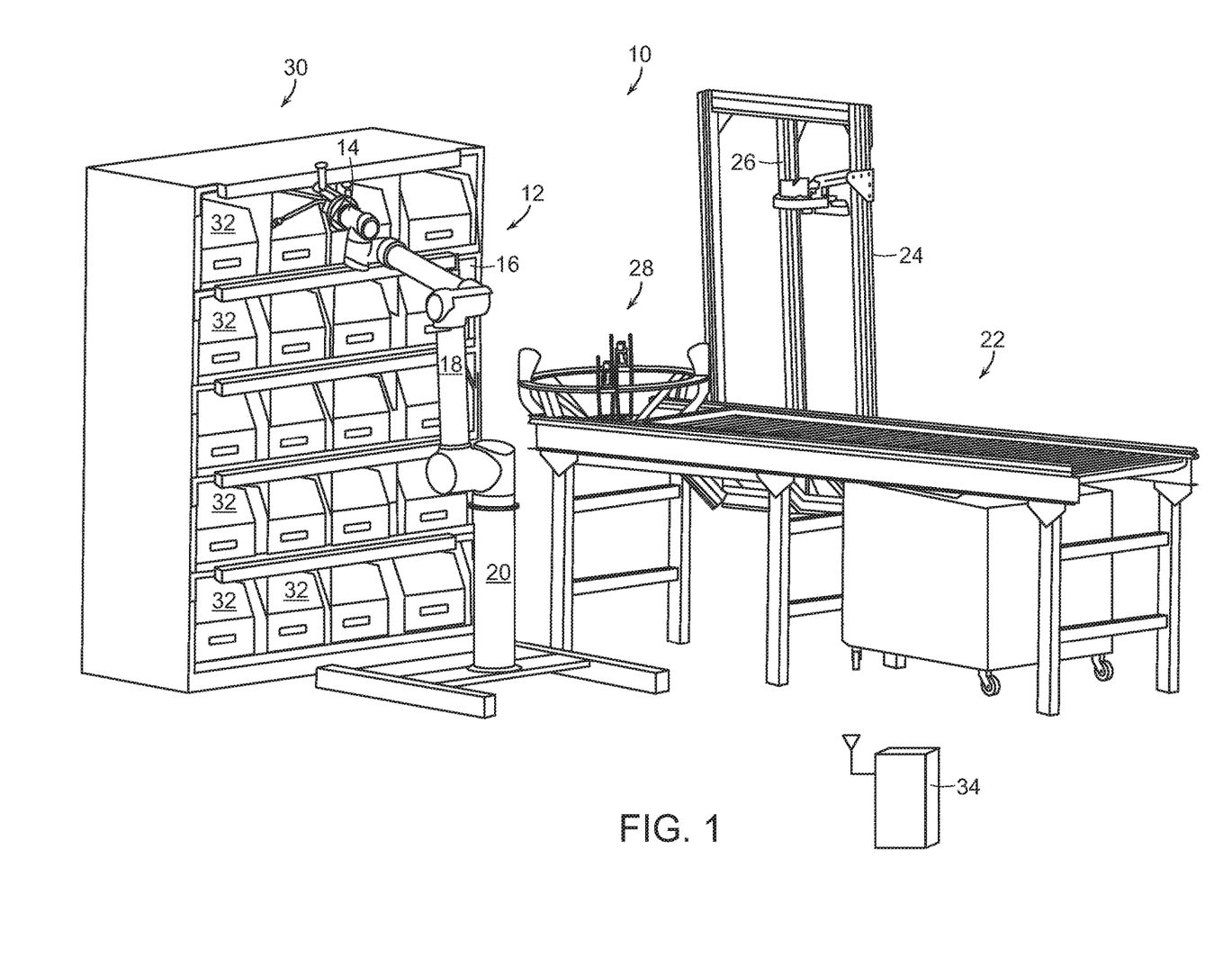
FIG. 1 shows an illustrative diagrammatic view of a system in accordance with an embodiment of the present invention.

An automated article identification system in accordance with an embodiment of the present invention is shown in FIG. 1. FIG. 1 shows a robotic system 10 that includes an articulated arm 12 that includes an end effector 14 and articulated sections 16, 18 and 20. The articulated arm 12 selects items from a conveyor 22, that are either in a bin on the conveyor 22 or are on the conveyor itself. A stand 24 includes an attached first detection unit 26 that is directed toward the conveyor from above the conveyor. The perception system may be a perception unit 26, for example, a camera, or a scanner such as a laser reflectivity scanner or other type of barcode reader, or a radio frequency ID scanner. A plurality of additional perception units are provided on a perception system 28 (as will be discussed in more detail below with reference to FIG. 2).

The robotic system 10 may further include the robotic environment, a target station 30 that includes a number of bins 32 into which objects may be placed after identification. A central computing and control system 34 may communicate with the perception unit 26 and the perception system 28 as well as the articulated arm 12 via wireless communication, or, in certain embodiments, the central computing and control system 34 may be provided within the base section 20 of the articulated arm.

Figure 2:
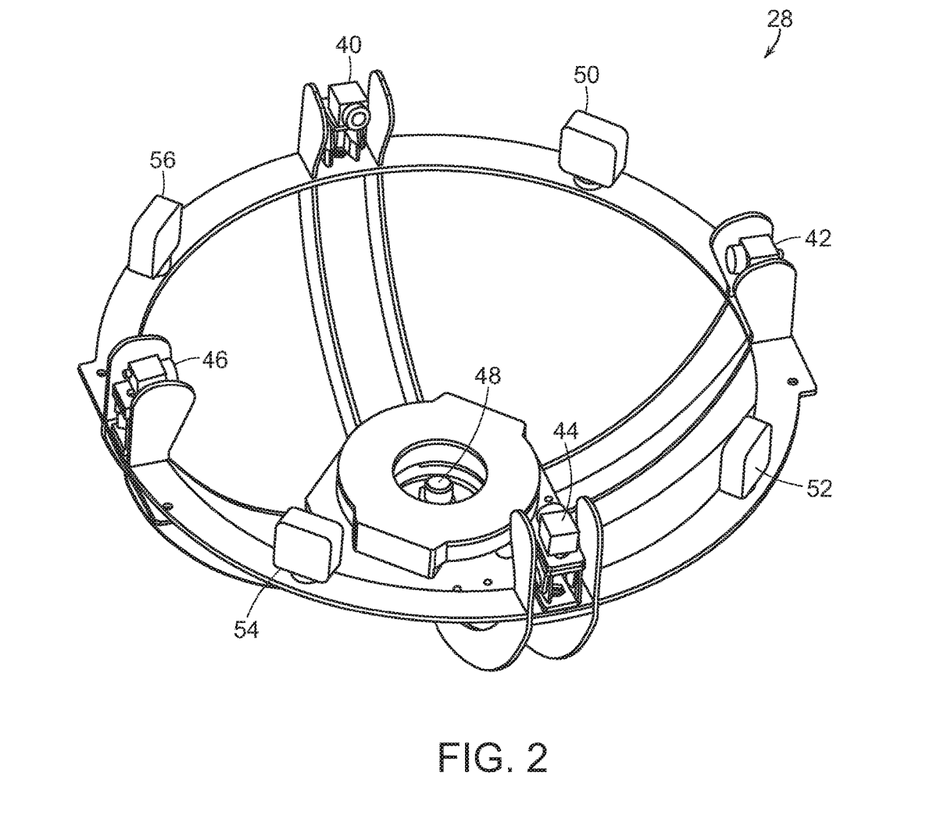
FIG. 2 shows an illustrative diagrammatic view of a portion of the system of FIG. 1 that includes a plurality of perception units.

FIG. 2 shows the perception system 28 that includes a plurality of perception units 40, 42, 44, 46 and 48, as well as a plurality of illumination sources 50, 52, 54 and 56 for use in certain embodiments of the present invention. Each of the perception units 40, 42, 44, 46 and 48 may be, for example, a camera (e.g., 2D or 3D), or a scanner such as a laser reflectivity scanner or other type of barcode reader (e.g., 1D or 2D barcode scanners), or a radio frequency ID scanner together with the associated software to process the perceived data.

Generally, the system provides in a specific embodiment, an automated article identification system that includes a robotic pick and place system that is able to pick articles up, move them in space, and place them. The system also includes the set of objects themselves to be identified; the manner in which inbound objects are organized, commonly in a heterogeneous pile in a bin or in a line on a conveyor; the manner in which outbound objects are organized, commonly in an array of outbound bins, or shelf cubbies; the manner in which objects are labeled with barcodes or radio-frequency identification tags; a fixed primary scanner operating above the incoming stream of objects; a barcode scanning station where one or more barcode scanners and illuminators are activated when the object is held at the station; and a central computing and control system determines the appropriate location for placing the object, which is dependent on the object's decoded barcode.

As noted, the robotic pick and place system is typically a robotic arm equipped with sensors and computing, that when combined is assumed herein to exhibit the following capabilities: (a) it is able to pick objects up from a specified class of objects, and separate them from a stream of heterogeneous objects, whether they are jumbled in a bin, or are singulated on a motorized or gravity conveyor system, (b) it is able to move the object to arbitrary places within its workspace, (c) it is able to place objects in an outgoing bin or shelf location in its workspace; and, (d) it is able to generate a map of objects that it is able to pick, represented as a candidate set of grasp points in the workcell, and as a list of polytopes enclosing the object in space.

The allowable objects are determined by the capabilities of the robotic pick and place system. Their size, weight and geometry are assumed to be such that the robotic pick and place system is able to pick, move and place them. These may be any kind of ordered goods, packages, parcels, or other articles that benefit from automated sorting. In certain embodiments, each object is associated with a stock keeping unit (SKU), which identifies the item.

Figure 3:
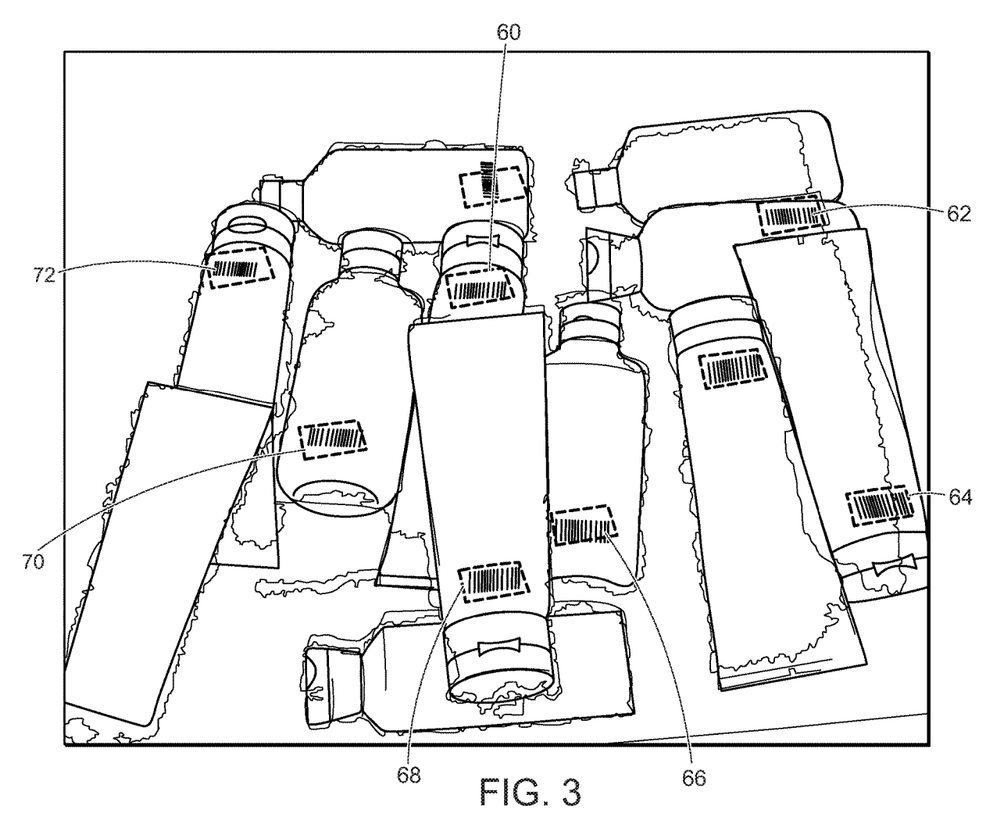
FIG. 3 shows an illustrative diagrammatic view of perception image data of a set of objects to be sorted as presented at an infeed station in a system in accordance with an embodiment of the present invention.

The manner in which inbound objects arrive may, for example, to be in one of two configurations: (a) inbound objects arrive piled in bins of heterogeneous objects as shown in FIG. 3; or (b) inbound articles arrive by a moving conveyor. As shown in FIG. 3, the collection of objects includes some that have exposed bar codes as shown at 60, 62, 64, 66, 68, 70 and 72, and other objects that do not have exposed bar codes. The robotic pick and place system is assumed to be able to pick items from the bin or conveyor. The stream of inbound objects is the sequence of objects as they are unloaded either from the bin or the conveyor.

The manner in which outbound objects are organized is such that articles are placed in a bin, shelf location or cubby or other destination location at which all objects corresponding to a given order are consolidated. These outbound destinations may be arranged in vertical arrays, horizontal arrays, grids, or some other regular or irregular manner, but which arrangement is known to the system. The robotic pick and place system is assumed to be able to place objects into all of the outbound destinations, and the correct outbound destination is determined from the SKU of the object.

It is assumed that the objects are marked in one or more places on their exterior with a visually distinctive mark such as a barcode or radio-frequency identification (RFID) tag or other unique identifier so that they may be identified by a scanner. The type of marking depends on the type of scanning system used, but may include 1D or 2D barcode symbologies. Multiple symbologies or labeling approaches may be employed. The types of scanners employed are assumed to be compatible with the marking approach. The marking, either by barcode, RFID tag, or other means, encodes a symbol string, which is typically a string of letters and numbers. The symbol string uniquely associates the object with a SKU.

The primary perception unit 26 is a device mounted above the area where the inbound objects arrive, which scans all inbound objects for identifying features. When inbound objects arrive in bins, the primary perception unit is mounted above the bin. The primary perception unit consists of one or more devices that are able to recognize visually distinctive marks, which may include barcodes or other identifying features, or RFID tags on the objects. Unit components may include cameras, RFID scanners, illuminators, and decoding microprocessors. The primary perception unit makes the first pass at recognizing items in the bin. The primary perception unit localizes any codes that it has found, and the robotic pick and place system is assumed to be able to use that location to pick the item with the given code.

The perception system 28 (e.g., the secondary scanners) is an assembly that scans any objects that the primary perception unit is unable to scan among the inbound objects, or that scans the objects to confirm the results of the primary perception unit. In further embodiments, the secondary scanners may be used to detect any additional indicia, which may either confirm the identification or may detect that more than one object has been grasped, in which case, both are returned to the input inbound area. Inbound objects in a bin or on a conveyor may have labels or tags partially or completely occluded by other objects, or the labels or tags may not be facing the scanner. The secondary perception system is mounted in the workspace of the robotic pick and place system so that unidentified articles may be presented to the secondary scanner. Like the primary perception unit, the secondary perception system consists of one or more perception devices, which may include cameras, RFID scanners, illuminators, and decoding microprocessors.

The operations of the systems described above are coordinated by the central control system 34. This system determines from perception data (e.g., symbol strings) the SKU associated with an object, as well as the outbound destination for the object. The central control system is comprised of one or more workstations or central processing units (CPUs). The correspondence between SKUs and outbound destinations is maintained by the central control system in a database called a manifest. The central control system maintains the manifest by communicating with a warehouse management system (WMS).

During operation, the broad flow of work may be generally as follows. First, the system is equipped with a manifest that provides the outbound destination for each inbound object. Next, the system waits for inbound objects to arrive either in a bin or on a conveyor. When the robotic pick and place system recognizes that one or more inbound objects are present, the central control system instructs the primary perception unit to scan the inbound objects. The primary perception unit creates a list of detected markings, which includes their symbol strings, as well as their positions in the workspace. The primary perception unit transmits this list to the central control system.

The central control system receives from the primary perception unit the perceived information including the detected markings, and from the robotic pick and place system it receives a list of unidentified but pick-able objects. The position coordinates in both lists are registered to one another by employing calibration information about the primary scanner and the robotic pick and place system. The central control system employs the map generated by the robotic pick and place system to determine by simple geometric means the objects that enclose each detected marking. Thus, the central control system associates for each marking the object to which it corresponds. This step is a marking-based data association. The central control system ranks each of the candidate articles to pick based on a heuristic, such as choosing the top-most object in a pile, and so generates a candidate pick list.

Again, FIG. 3 shows an example of a marking-based data association between objects identified by the robotic pick and place system and markings detected by a perception unit. In this instance barcode symbols (bounding quadrilaterals) are associated with the unidentified objects (shaded segments) in which the barcode symbols lie.

If there is at least one candidate pick in the candidate pick list that is associated with a marking, the system picks the highest-ranking pick. The expectation is that the picked object will correspond to the marking previously associated by the central control system, and detected by the primary perception unit. Given that this association may potentially be erroneous, the central control system runs a check. After the object has been removed and separated from the set of inbound objects, the system instructs the primary perception unit to scan the inbound articles again. If the correct object was removed, then the marking associated with it should no longer be in the list of markings detected by the primary perception unit. If the marking associated with the picked item is still there however, then it must be that it picked the wrong item. If it picked the wrong item, then it puts the item back and repeats the process of generating pick candidates from the robotic pick and place system and primary scanner.

If there are no candidate picks associated with a marking, then it picks the object associated with the highest-ranking pick. Since there is no marking associated with the object, it is an unidentified object. After the robotic pick and place system picks the item out of the set of inbound objects, the central control system instructs the robotic pick and place system to move the object to the secondary perception system for scanning. The central control system instructs the secondary perception system to scan the unidentified object.

If the secondary perception system successfully recognizes a marking on the object, then the object is then identified and the central control system commands the robotic pick and place system to transfer the item to the outbound destination determined from the SKU, itself determined from the detected marking.

If the secondary perception system is unable to recognize a marking on the object, then depending on the configuration of the scanner, the central control system may command the robotic pick and place system to rotate the object to try to make markings visible to the scanners, and to scan the object again. This may occur a number of times to guarantee that if the marking were on the object, then it would be detected. The sequence of locations and orientations of the objects are chosen so as to minimize the average or maximum amount of time that secondary scanning takes. If the object cannot be identified or if the secondary perception system detects non-matching product identifiers (possibly indicating a double pick), the object may be transferred to a special outbound destination for unidentified objects, or it may be returned to the inbound stream.

This entire procedure operates in a loop until all of the objects in the inbound set are depleted. The objects in the inbound stream are automatically identified, sorted, and routed to outbound destinations.

In accordance with an embodiment therefore, the invention provides a system for sorting objects that arrive by inbound bins and that need to be placed into a shelf of outbound bins, where sorting is to be based on a barcode symbol. In this embodiment, the primary and secondary perception systems are able to detect and decode barcode symbologies.

Key specializations in this embodiment are the specific design of the primary and secondary perception systems so as to maximize the probability of a successful scan, while simultaneously minimizing the average scan time. The probability of a successful scan and the average scan time make up key performance characteristics. These key performance characteristics are determined by the configuration and properties of the primary and secondary perception systems, as well as the object set and how they are marked.

The two key performance characteristics may be optimized for a given item set and method of barcode labeling. Parameters of the optimization for a barcode system include how many barcode scanners to include where and in what orientation to place them, and what sensor resolutions and fields of view for the scanners to use. Optimization can, in certain embodiments, be done by simulation with models of the object.

Optimization through simulation employs a barcode scanner performance model. A barcode scanner performance model is the range of positions, orientations and barcode element size that a barcode symbol can be detected and decoded by the barcode scanner, where the barcode element size is the size of the smallest feature on the barcode. These are typically rated at a minimum and maximum range, a maximum skew angle, a maximum pitch angle, and a minimum and maximum tilt angle.

If a barcode scanner and symbol are held upright, and the barcode symbol is facing the scanner such that the symbol is parallel to the sensor-side of the scanner, then the barcode symbol is in what is called the fronto-parallel plane. The angle between the fronto-parallel plane and a plane that rotates about the vertical axis is the skew angle. The angle between the fronto-parallel plane and a plane that rotates about the horizontal axis is the pitch axis. The angle a feature on the fronto-parallel makes as it rotates about an axis perpendicular to the fronto-parallel plane is the tilt axis.

Typical performances for camera-based barcode scanners are that they are able to detect barcode symbols within some range of distances as long as both pitch and skew of the plane of the symbol are within the range of plus or minus 45 degrees, while the tilt of the symbol can be arbitrary (between 0 and 360 degrees). The barcode scanner performance model predicts whether a given barcode symbol in a given position and orientation will be detected.

The barcode scanner performance model is coupled with a model of where barcodes would expect to be positioned and oriented. A barcode symbol pose model is the range of all positions and orientations, in other words poses, in which a barcode symbol will expect to be found. For the secondary scanner, the barcode symbol pose model is itself a combination of an article gripping model, which predicts how objects will be held by the robotic pick and place system, as well as an barcode-item appearance model, which describes the possible placements of the barcode symbol on the object. For the primary scanner, the barcode symbol pose model is itself a combination of the barcode-item appearance model, as well as an inbound-object pose model, which models the distribution of poses over which inbound articles are presented to the primary scanner. These models may be constructed empirically, modeled using an analytical model, or approximate models can be employed using sphere models for objects and a uniform distributions over the sphere as a barcode-item appearance model.

In an embodiment for example, two objects, a bottle and a toothpaste container, represent the object set, and the barcode symbols are placed in fixed and known locations on all instances of these objects. With a 3D model of these two objects, the known capabilities of the robotic pick and place system are used to generate a random sample of poses of the objects. These poses are with respect to the end-effector of the robotic pick and place system, typically a gripper.

Figure 4:
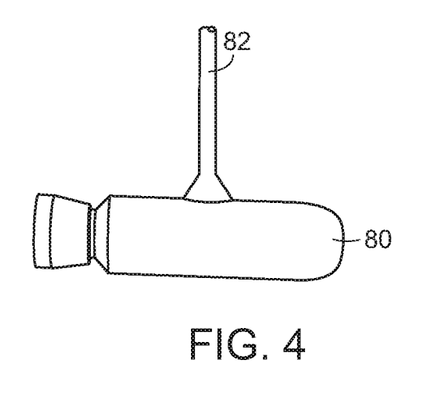
FIG. 4 shows an illustrative diagrammatic view of a single simulated hold of an object to be identified in accordance with an embodiment of the present invention.
Figure 5:
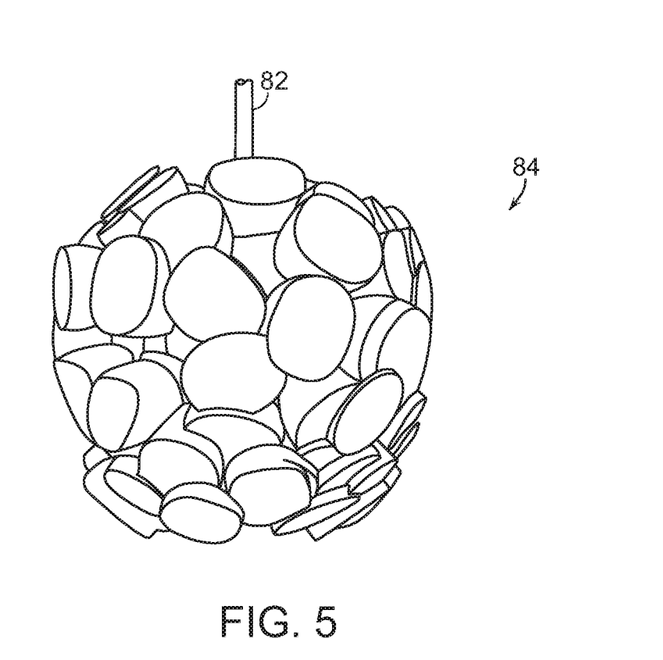
FIG. 5 shows an illustrative diagrammatic view of multiple overlapping simulated holds of the object of FIG. 4.
Figure 6:
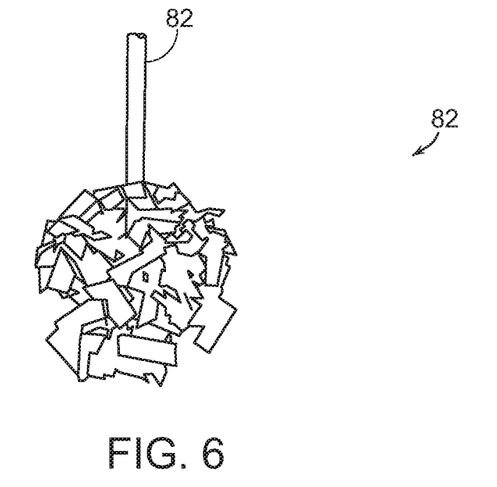
FIG. 6 shows an illustrative diagrammatic view of simulated overlapping positions of many barcodes.

FIG. 4 shows an example of a single simulated hold of a bottle 80, as held by an end effector 82 of a vacuum-gripperbased robotic pick and place system. FIG. 5 shows at 84 overlapping samples of the bottle 80 shown in FIG. 4. With these samples, and because the barcode symbols are at fixed positions on the two articles, a set of poses of barcode symbols are generated. FIG. 6 shows at 86 an example where the quadrilaterals represent 100 sampled barcode symbols. This sample represents the barcode symbol pose model for a secondary scanner. It is an approximation of a probability distribution over where barcodes would expect to be found when the article is held by the robotic pick and place system.

Figure 7:
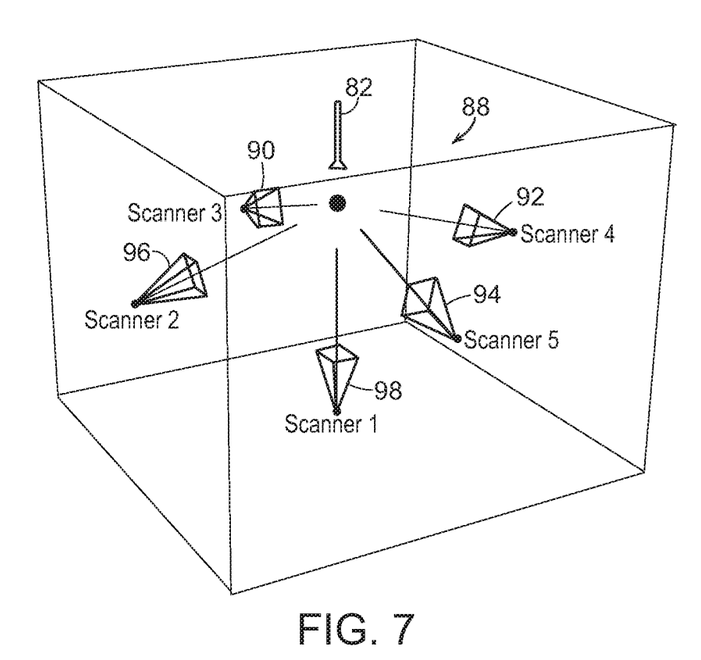
FIG. 7 shows an illustrative diagrammatic view of a configuration of perception units based on the modelling of FIGS. 4-6.

With these models, the barcode symbol pose model and the barcode scanner performance model, optimization over all of the parameters of the system is possible. FIG. 7 shows the resulting configuration, determined by simulation of the above described models, of a secondary scanner system determined for the instance where the articles are a bottle and toothpaste container. As shown in FIG. 7, the system includes scanners 90, 92, 94, 96 and 98, each of which is generally directed toward an object area 88, while the position of each of the scanners 90-98 is selected to provide optimum planes, angles, tilts and views for the objects in question. FIG. 7 shows a mechanical model of the actualized secondary scanner. In this instance the optimization criteria was the probability of scan success. In instances where only one scanner can be employed, the optimization criteria may be average scan time, in which case the optimization is over the sequence of poses in which to present articles to a secondary scanner so that the average scan time as a whole is decreased.

In accordance with a further embodiment therefore, the invention may be used in connection with an object sortation system that yields a large (and very flexible) number of total collection bins, very low divert costs per bin, throughput as high as that of a manual system, and a far smaller need for manual labor to operate.

Figure 8:
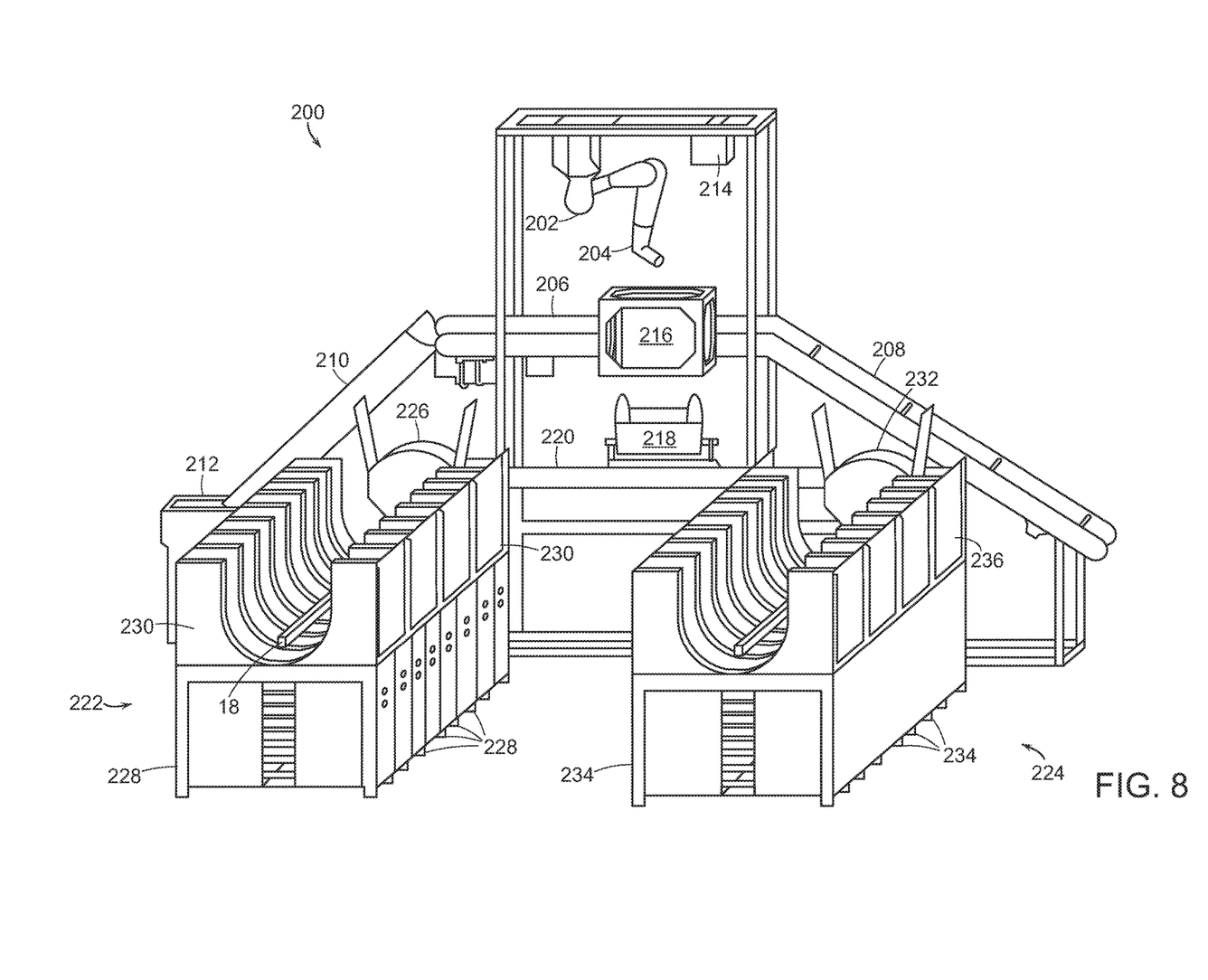
FIG. 8 shows an illustrative diagrammatic view of a system in accordance with a further of the present invention.

FIG. 8, for example, shows a system 200 that includes an articulated arm 202 with an end effector 204, an input area 206 in which objects are presented for sortation, a primary perception system (e.g., a perception unit) 214 such as a camera for identifying objects to be sorted, and a receiving conveyor 208 for receiving objects to be sorted from any of a human worker, another conveyor, or an input pan. The system also includes a non-sortable output chute 210 that leads to a non-sortable output bin 212 for providing objects that the system either could not identify or could not sort of any other reason (e.g., could not grasp or pick up).

In addition to the primary perception unit 214, the system also includes a drop perception system 216, which includes an open top and an open bottom, and a plurality of perception units (e.g., cameras or sensors as discussed above with reference to the previous embodiments) positioned within the perception system 216 that are aimed at the top, mid and lower central regions of the interior of the perception system 216. The plurality of perception units, e.g., cameras, record perception data, e.g., images, of an object when it is dropped by the end effector through the perception system 216. The drop perception system 216 may also include one or more sensors (e.g., laser sensors) at the top of the system 216 that detect when an object is dropped into the drop perception system 216. The plurality of perception units are designed to collect a plurality of images of each object from multiple views to aid in identifying or confirming the identity of the dropped object.

The dropped object then falls into a first carriage 218 which is provided on a track 220 on which the conveyor 218 may be moved automatically between a first sortation stage 222 and a second sortation stage 224 on either side of the area in which the object was dropped.

The first sortation stage 222 includes a second carriage 226 that may receive objects from the first carriage 218, and which travels along a track between two rows of collection bins 228 into which objects may be dumped along guide walls 230. The second sortation stage 224 includes a third carriage 232 that may receive objects from the first carriage 218, and which travels along a track between two rows of collection bins 234 into which objects may be dumped along guide walls 236.

The system of FIG. 8 shows a system with two shuttle sort wings. When an object is picked from the infeed conveyor, it is dropped onto the first shuttle sorter 218. That shuttle sorter carries the object to one of two wings, drops the object in the carrier for that wing, and then moves back to home. Due to the limited travel, this back and forth operation may be performed in the time it takes the articulated arm to pick another object (assuming the articulated arm is picking objects at approximately a human rate of throughput).

The drop perception system 216 includes a plurality of detection units (e.g., cameras or scanners as discussed above) that are directed toward a central path such that as an object falls through the unit 216, multiple views of the object will be captured by the multiple detection units. The drop perception system may also include lights as discussed above with reference to the system of FIG. 2.

Figure 9:
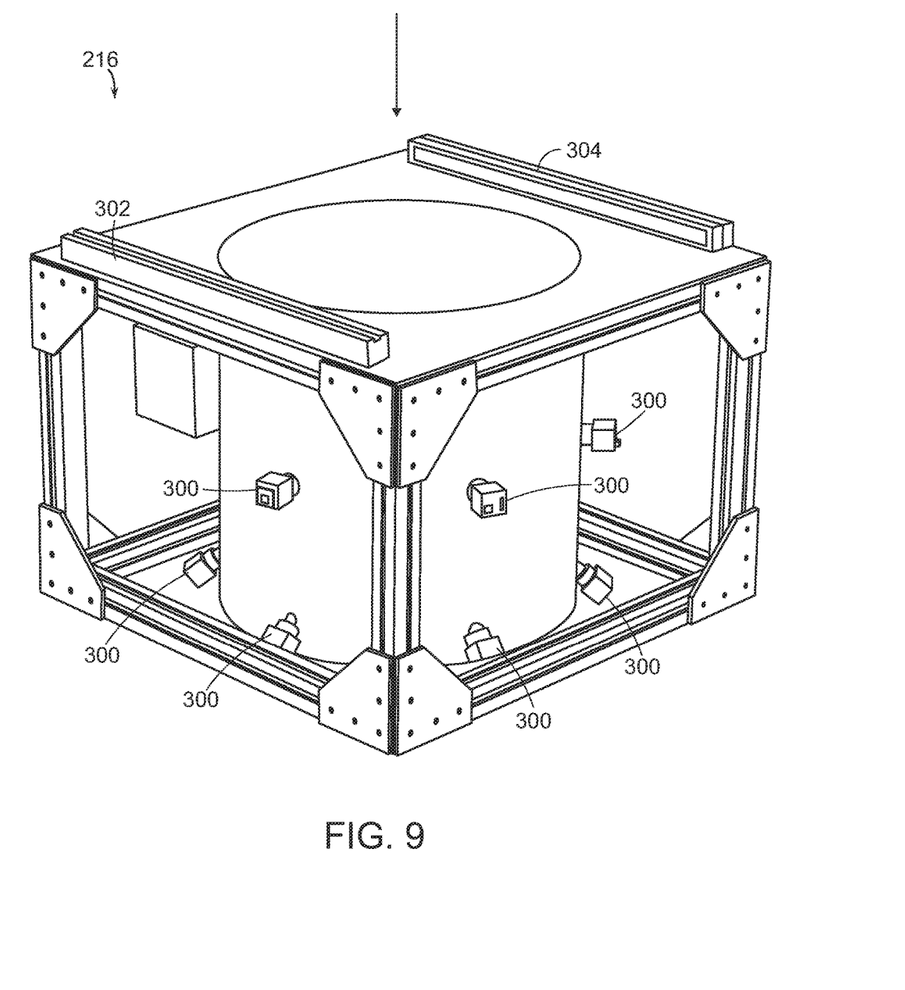
FIG. 9 shows an illustrative diagrammatic isometric view of a drop perception unit for use in accordance with the system of FIG. 8.
Figure 10:
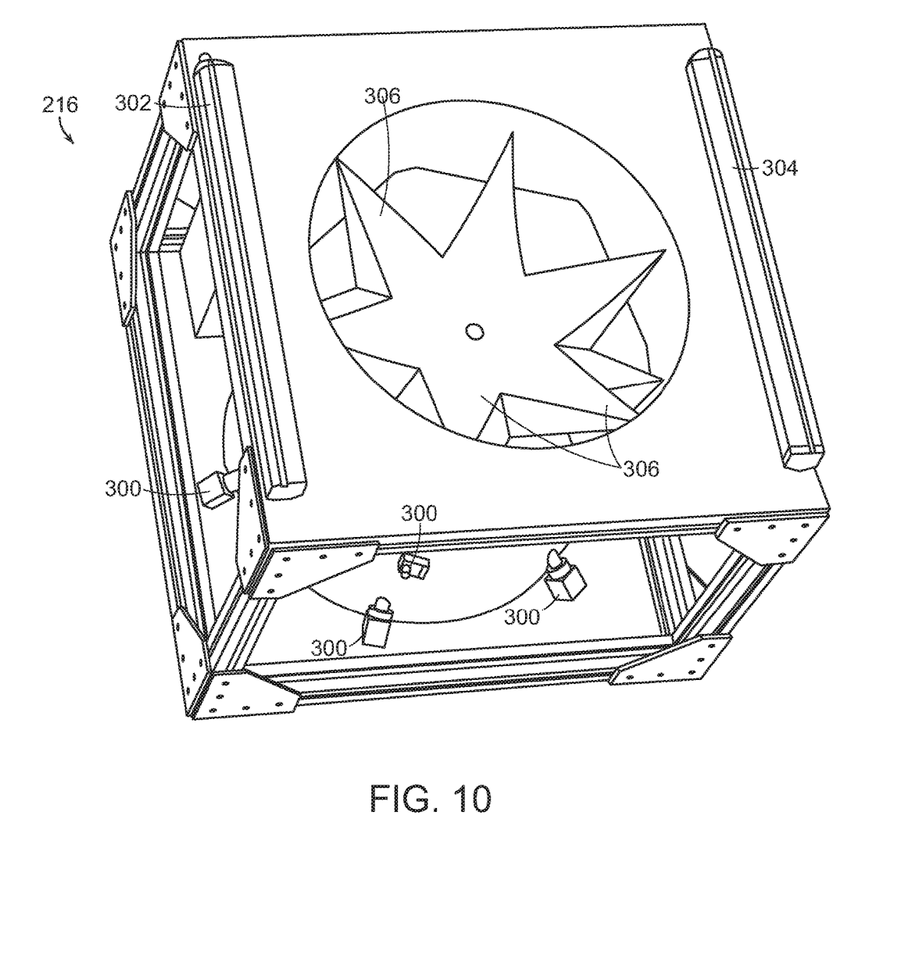
FIG. 10 shows an illustrative diagrammatic top view isometric view of the drop perception unit of FIG. 9.

FIGS. 9 and 10 show the detection units 300 directed toward the central path of the drop perception system 216 at varying angles. As also shown, a laser source bar 302 may direct laser illumination toward a sensor bar 304 such that the drop perception system 216 may detect exactly when an object enters the system 216. FIG. 10 shows at 306 diagrammatic illustrations of the multiple detector angles and fields of view for each of the multiple detectors.

The plurality of additional perception systems may be positioned such that every surface of the object may be perceived regardless of the orientation of the object. In certain embodiments, the first perception system may provide perception data regarding a unique object identifier, and the plurality of additional perception systems may provide additional perception data regarding any of confirming the object identifier or any additional object identifiers. In further embodiments, the first perception system may provide perception data regarding an object shape, and the plurality of additional perception systems may provide additional perception data regarding a unique object identifier that is confirmed as matching the object shape.

Those skilled in the art will appreciate that numerous modifications and variations may be made to the above disclosed embodiments without departing from the spirit and scope of the present invention.

What is claimed is:

1. An object processing system for identifying objects, said object processing system comprising:
   a first identity capturing device for providing first identity data regarding a first view of an object at a first location;
   a plurality of additional identity capturing devices, each of which is arranged to be directed toward a perception area for providing further identity data regarding a plurality of views of the object within the perception area, said first view and said plurality of views providing views of all surfaces of the object;
   a computer processing system for receiving the first identity data and the further identity data, and for determining an identification of the object; and an end effector for acquiring the object for movement from the first location to the perception area if the computer processing system cannot determine the identification of the object using only the first identity data.

2. The object processing system as claimed in claim 1, wherein the first identity capturing device includes a camera that is positioned above an area into which the objects are provided for identification and processing by the object processing system.

3. The object processing system as claimed in claim 1, wherein the plurality of additional identity capturing devices are positioned such that every surface of the object may be perceived regardless of the orientation of the object.

4. The object processing system as claimed in claim 1, wherein the first identity capturing device provides the first identity data regarding a unique object identifier, and wherein the plurality of additional identity capturing devices provide the further identity data that enables the computer processing system to perform any of confirming the unique object identifier or any additional object identifiers.

5. The object processing system as claimed in claim 1, wherein the first identity capturing device further provides object shape data regarding an object shape, and wherein the plurality of additional identity capturing devices provide the further identity data regarding a unique object identifier that is confirmed by the computer processing system as matching the object shape.

6. The object processing system as claimed in claim 1, wherein the object processing system further includes a routing system for receiving the object from the object identification system, and for routing the object in one of a plurality of directions responsive to at least one of the first identity data and the further identity data.

7. The object processing system as claimed in claim 1, wherein the perception area is defined by the plurality of additional perception units, and is generally in the shape of a bowl having a generally circular opening such that the end effector may introduce the object into the perception area through the generally circular opening.

8. The object processing system as claimed in claim 1, wherein the plurality of additional perception units are provided in a drop perception system having an open top through which an object may be dropped, and an open bottom through which the object may fall to a routing system for routing the object in one of a plurality of directions responsive to at least one of the first identity data and the further identity data.

9. The object processing system as claimed in claim 1, wherein the computer processing system determines a shape of the object.

10. The object processing system as claimed in claim 9, wherein the computer processing system generates a candidate pick list of objects to be selected from an inbound area.

11. The object processing system as claimed in claim 10, wherein the candidate pick list of objects ranks at least some of the objects corresponding to a desired pick order.

12. The object processing system as claimed in claim 1, wherein the first identity capturing device includes a scanner that is positioned above an area into which the objects are provided for identification and processing by the object processing system.

13. The object processing system as claimed in claim 12, wherein the scanner is a laser reflectivity scanner.

14. The object processing system as claimed in claim 12, wherein the scanner is a radio frequency ID scanner.

15. The object processing system as claimed in claim 1, wherein the plurality of additional identity capturing devices include a plurality of cameras.

16. The object processing system as claimed in claim 15, wherein the plurality of cameras includes five cameras that are collectively arranged to simulate holding the object in at least four different poses.

17. The object processing system as claimed in claim 15, wherein the plurality of cameras are provided in a drop camera unit into which an object may be dropped and scanned by the plurality of cameras as the object is falling through the unit.

18. The object processing system as claimed in claim 1, wherein the plurality of additional identity capturing devices include a plurality of scanners.

19. The object processing system as claimed in claim 18, wherein each of the plurality of scanners is a laser reflectivity scanner.

20. The object processing system as claimed in claim 18, wherein each of the plurality of scanners is a radio frequency ID scanner.

21. The object processing system as claimed in claim 18, wherein the plurality of scanners includes five scanners that are collectively arranged to simulate holding the object in at least four different poses.

22. The object processing system as claimed in claim 18, wherein the plurality of scanners are provided in a drop scanner unit into which an object may be dropped and scanned by the plurality of scanners as the object is falling through the unit.

23. A method of identifying an object in an object processing system including an end effector, said method comprising the steps of:
providing, by a first identity capturing device, first identity data regarding a first view of an object at a first location;
determining whether an identity of the object may be determined responsive to the first identity data, and if the identity of the object cannot be determined from the first identity data:
moving the object using the end effector to a plurality of additional identity capturing devices at a second location; and
providing further identity data regarding a plurality of views of the object within a perception area, by the plurality of additional identity capturing devices, each of which is arranged to be directed toward the object in the perception area from a different view of the plurality of views of the object within the perception area that may be obtained by the plurality of additional identity capturing devices, the first view of the object and the plurality of views of the object providing views of all surfaces of the object; and
processing any of the first identity data and the further identity data to identify the object.

24. The method as claimed in claim 23, wherein the method further includes the step of moving the object toward the first identity capturing device by a conveyor.

25. The method as claimed in claim 23, wherein the method further includes the step of moving the object toward the first identify capturing device together with a plurality of other, different objects.

26. The method as claimed in claim 23, wherein the step of moving the object to a plurality of additional identity capturing devices employs an articulated arm.

27. The method as claimed in claim 23, wherein the method further includes the step of verifying by using a computer processing system, whether an identification of a picked object that has been picked up by the end effector is the same as an identification of a selected object that was selected to be picked up by the end effector.

28. The method as claimed in claim 23, wherein the plurality of additional identity capturing devices are positioned such that together with the first view of the object, every surface of the object may be perceived regardless of the orientation of the object.

29. The method as claimed in claim 23, wherein the first identity capturing device provides the first identity data regarding a unique object identifier, and wherein the plurality of additional identity capturing devices provide the further identity data regarding any of confirming the object identity or any additional object identities.

30. The method as claimed in claim 23, wherein the first identity capturing device further provides object shape data regarding an object shape, and wherein the plurality of additional identity capturing devices provide additional the further identity data regarding a unique object identifier that is confirmed as matching the object shape.

31. The method as claimed in claim 23, wherein the plurality of additional perception units are arranged in a general shape of a bowl having a generally circular opening such that the end effector may introduce the object into the perception area through the generally circular opening.

32. The method as claimed in claim 23, wherein the plurality of additional perception units are provided in a drop perception system having an open top, and an open bottom, and wherein the method further includes the step of dropping the object into the drop perception unit, permitting the object to fall through the open bottom of the drop perception unit, receiving the object at a routing system, and directing the object in on of a plurality of directions using the routing system responsive to at least one of the first identity data and the further identity data.

33. The method as claimed in claim 23, wherein the method further includes the step of routing the object in one of a plurality of directions responsive to at least one of the first identity data and the further identity data.

34. The method as claimed in claim 23, wherein the method further includes the step of providing multi-object data regarding a plurality of additional objects near the object.

35. The method as claimed in claim 34, wherein the method further includes the step of providing supplemental multi-object data following the step of moving the object to confirm that the object was selected and moved.

36. The method as claimed in claim 23, wherein the plurality of additional identity capturing devices include a plurality of cameras.

37. The method as claimed in claim 36, wherein the plurality of cameras are provided in a drop camera unit, and the method further includes the steps of dropping an object into the drop camera unit and scanning by the plurality of cameras as the object is falling through the unit.

38. The method as claimed in claim 23, wherein the plurality of additional identity capturing devices include a plurality of scanners.

39. The method as claimed in claim 38, wherein the plurality of scanners are provided in a drop scanner unit, and the method further includes the steps of dropping an object into the drop scanner unit and scanning by the plurality of scanners as the object is falling through the unit.

40. An object identification system for identifying an object, said object identification system comprising a detection unit, a computer processing system and a routing system, said detection unit including a plurality of identity capturing devices that are each positioned to be directed toward a plurality of locations along an object path that the object may take as it travels into the object identification system, said plurality of identity capturing devices capturing identity data regarding all surfaces of the object, said computer processing system providing the identity of the object responsive to the identity data, and said routing system for receiving the object from the object identification system, and for routing the object in one of a plurality of directions responsive to the identity data.

41. The object identification system as claimed in claim 40, wherein the plurality of identity capturing devices include a plurality of cameras.

42. The object identification system as claimed in claim 40, wherein the plurality of identity capturing devices include a plurality of scanners.

43. The object identification system as claimed in claim 40, wherein the plurality of identity capturing devices include identity capturing devices at least at the bottom and central regions of the object identification system.

44. The object identification system as claimed in claim 40, wherein the plurality of identity capturing devices are arranged generally in the shape of a bowl having a generally circular opening such that the end effector may introduce the object into the perception area through the generally circular opening.

45. The object identification system as claimed in claim 40, wherein the plurality of identity capturing devices are provided in a drop perception system having an open top through which an object may be dropped, and an open bottom through which the object may fall.

46. The object identification system as claimed in claim 40, wherein the object identification system includes at least one sensor system for detecting whether an object has entered the detection unit.

47. The object identification system as claimed in claim 46, wherein the at least one sensor system includes a laser source and a laser sensor.

48. An object identification system comprising:
an end effector for acquiring an object for movement from a first location to a perception area;
a plurality of identity capturing devices, each of which is arranged to be directed toward the perception area in which the object may be positioned by the end effector such that identity data regarding a plurality of views within the perception area may be obtained by the plurality of identify capturing devices from distances from the perception area sufficient to detect identifying indicia on the object, said plurality of views including views of all surfaces of the object, said perception area being defined by the plurality of additional perception units, and being generally in the shape of a bowl having a generally circular opening such that the end effector may introduce the object into the perception area through the generally circular opening; and
a computer processing system for providing an identity of the object responsive to the identity data provided by the plurality of identity capturing devices.

49. The object identification system as claimed in claim 48, wherein the plurality of identity capturing devices includes a plurality of cameras.

50. The object identification system as claimed in claim 48, wherein the plurality of identity capturing devices includes a plurality of scanners.

51. The object identification system as claimed in claim 48, wherein the system further includes a routing system for receiving the object from the object identification system, and for routing the object in one of a plurality of directions responsive to the identity data.

52. The object identification system as claimed in claim 48, wherein the plurality of identity capturing devices encircle the perception area in three dimensions.

53. The object identification system as claimed in claim 52, wherein the plurality of identity capturing devices are positioned a fixed locations.

54. A method of identifying an object in an object processing system including an end effector, said method comprising the steps of:
providing, by a first identity capturing device, first identity data regarding a first view of an object at a first location;
moving the object using the end effector from the first location to a plurality of additional identity capturing devices at a second location;
providing further identity data regarding a plurality of views of the object within a perception area at the second location, by the plurality of additional identity capturing devices, each of which is arranged to be directed toward the object in the perception area from a different view of the plurality of views of the object within the perception area that may be obtained by the plurality of additional identity capturing devices, the first view of the object and the plurality of views of the object providing views of all surfaces of the object;
processing the first identity data and the further identity data to identify the object; and
routing the object responsive to the determined identity of the object in one of a plurality of directions.

55. The method as claimed in claim 54, wherein the method further includes the step of moving the object toward the first identity capturing device by a conveyor.

56. The method as claimed in claim 54, wherein the step of moving the object to a plurality of additional identity capturing devices employs an articulated arm.

57. The method as claimed in claim 54, wherein the method further includes the step of verifying by using a computer processing system, whether an identification of a picked object that has been picked up by the end effector is the same as an identification of a selected object that was selected to be picked up by the end effector.

58. The method as claimed in claim 54, wherein the plurality of identity capturing devices are arranged generally in the shape of a bowl having a generally circular opening such that the end effector may introduce the object into the perception area through the generally circular opening.

59. The object identification system as claimed in claim 54, wherein the plurality of identity capturing devices are provided in a drop perception system having an open top, and an open bottom, and wherein the method further includes the step of dropping the object into the drop perception unit and permitting the object to fall through the open bottom of the drop perception unit.

60. The method as claimed in claim 54, wherein the plurality of additional identity capturing devices include a plurality of cameras.

61. The method as claimed in claim 60, wherein the plurality of cameras are provided in a drop camera unit, and the method further includes the steps of dropping an object into the drop camera unit and scanning by the plurality of cameras as the object is falling through the unit.

62. The method as claimed in claim 54, wherein the plurality of additional identity capturing devices include a plurality of scanners.

63. The method as claimed in claim 62, wherein the plurality of scanners are provided in a drop scanner unit, and the method further includes the steps of dropping an object into the drop scanner unit and scanning by the plurality of scanners as the object is falling through the unit.

64. A method of identifying an object in an object processing system, said method comprising the steps of:
providing, by a first identity capturing device, first identity data regarding a first view of an object at a first location;
dropping the object into a drop perception unit at a second location;
providing further identity data regarding a plurality of views of the object within the drop perception unit by a plurality of additional identity capturing devices, each of which is arranged to be directed toward the object within the drop perception unit from a different view of the plurality of views of the object within the drop perception unit that may be obtained by the plurality of additional identity capturing devices, the first view of the object and the plurality of views of the object providing views of all surfaces of the object;
processing the first identity data and the further identity data to identify the object; and
routing the object responsive to the determined identity of the object in one of a plurality of directions.

65. The method as claimed in claim 64, wherein the method further includes the step of moving the object toward the first identity capturing device by a conveyor.

66. The method as claimed in claim 64, wherein the method further includes the step of moving the object toward the first identify capturing device together with a plurality of other, different objects.

67. The method as claimed in claim 64, wherein the step of moving the object to a plurality of additional identity capturing devices employs an articulated arm.

68. The method as claimed in claim 64, wherein the plurality of additional identity capturing devices include a plurality of cameras.

69. The method as claimed in claim 64, wherein the plurality of additional identity capturing devices include a plurality of scanners.

70. The method as claimed in claim 64, wherein the plurality of additional identity capturing devices are positioned such that every surface of the object may be perceived regardless of the orientation of the object.

* * * * *